(12) United States Patent
Pelissier et al.

(10) Patent No.: US 11,610,025 B2
(45) Date of Patent: Mar. 21, 2023

(54) INTEGRATED CIRCUIT CONFIGURED TO CARRY OUT SYMMETRIC ENCRYPTION OPERATIONS WITHOUT SECRET KEY TRANSMISSION

(71) Applicants: STMicroelectronics (Grenoble 2) SAS, Grenoble (FR); STMicroelectronics (Alps) SAS, Grenoble (FR)

(72) Inventors: Gilles Pelissier, Eybens (FR); Nicolas Anquet, Grenoble (FR); Delphine Le-Goascoz, Grenoble (FR)

(73) Assignees: STMicroelectronics (Grenoble 2) SAS, Grenoble (FR); STMicroelectronics (Alps) SAS, Grenoble (FR)

( * ) Notice: Subject to any disclaimer, the term of this patent is extended or adjusted under 35 U.S.C. 154(b) by 122 days.

(21) Appl. No.: 17/161,194

(22) Filed: Jan. 28, 2021

(65) Prior Publication Data
US 2021/0240862 A1    Aug. 5, 2021

(30) Foreign Application Priority Data
Jan. 31, 2020    (FR) ...................................... 2000996

(51) Int. Cl.
| | | |
|---|---|---|
| G06F 21/00 | (2013.01) | |
| G06F 21/72 | (2013.01) | |
| H04L 9/06 | (2006.01) | |
| H04L 9/08 | (2006.01) | |
| H04L 9/32 | (2006.01) | |

(52) U.S. Cl.
CPC ............ *G06F 21/72* (2013.01); *H04L 9/0631* (2013.01); *H04L 9/0637* (2013.01); *H04L 9/0866* (2013.01); *H04L 9/3247* (2013.01); *H04L 2209/12* (2013.01)

(58) Field of Classification Search
None
See application file for complete search history.

(56) References Cited

U.S. PATENT DOCUMENTS

| | | |
|---|---|---|
| 9,537,657 B1 | 1/2017 | Char et al. |
| 9,735,962 B1 | 8/2017 | Yang et al. |
| (Continued) | | |

FOREIGN PATENT DOCUMENTS

| | | |
|---|---|---|
| WO | 2011149983 A2 | 12/2011 |
| WO | 2015038690 A1 | 3/2015 |

OTHER PUBLICATIONS

INPI Search Report and Written Opinion for FR Appl. No. 2000996 dated Sep. 15, 2020 (11 pages).

*Primary Examiner* — Andrew J Steinle
(74) *Attorney, Agent, or Firm* — Crowe & Dunlevy

(57) ABSTRACT

An integrated circuit includes a secure hardware environment having a first input that receives a key number. A key generation device generates a secret key from the key number and a unique key. A signature generation device generates a signature associated with the key number. A second input of the secure hardware environment receives encrypted binary data. A decryption device operates to decrypt the received encrypted binary data using the secret key. A third input the secure hardware environment receives an authentication signature. An authentication device authorizes use of the secret key to decrypt only if the signature generated by the signature generation device is identical to the authentication signature.

19 Claims, 3 Drawing Sheets

(56) References Cited

U.S. PATENT DOCUMENTS

| | | |
|---|---|---|
| 9,806,887 B1 | 10/2017 | Campagna |
| 10,474,831 B1 | 11/2019 | Volkanov et al. |
| 2008/0170694 A1* | 7/2008 | Ryan .................. G06F 21/51 |
| | | 726/22 |
| 2014/0037009 A1 | 2/2014 | Park et al. |
| 2014/0037093 A1 | 2/2014 | Park et al. |
| 2016/0173282 A1 | 6/2016 | Circello et al. |
| 2017/0093567 A1* | 3/2017 | Gopal .................. G06F 21/602 |
| 2017/0126414 A1 | 5/2017 | Goel et al. |
| 2019/0268169 A1 | 8/2019 | Castillo |
| 2021/0124818 A1 | 4/2021 | Muthukumaran et al. |
| 2022/0150056 A1 | 5/2022 | Falk et al. |

* cited by examiner

INTEGRATED CIRCUIT CONFIGURED TO CARRY OUT SYMMETRIC ENCRYPTION OPERATIONS WITHOUT SECRET KEY TRANSMISSION

PRIORITY CLAIM

This application claims the priority benefit of French Application for Patent No. 2000996, filed on Jan. 31, 2020, the content of which is hereby incorporated by reference in its entirety to the maximum extent allowable by law.

TECHNICAL FIELD

Embodiments and implementations relate to integrated circuits configured to carry out symmetric encryption operations.

BACKGROUND

Symmetric encryption makes it possible to use a shared unique key to encrypt and then decrypt binary data. In order to keep the binary data secret, it is appropriate to ensure that the shared key is kept secret.

A known solution consists in making the key secret by encrypting it. The encrypted key can then be shared outside the secure environment.

This solution has the disadvantage of supplying a secret key, although encrypted, to software outside the secure environment. There is therefore a risk that an ill-intentioned person attempt to decrypt the shared secret key through a brute force attack.

There is therefore a need in the art for a solution for encrypting binary data that makes it possible to avoid sharing a secret key for decrypting encrypted binary data outside a secure environment.

SUMMARY

In an embodiment, an integrated circuit comprises a secure hardware environment including a decryption system comprising: a first input configured to receive a key number; a key generation device configured to generate a secret key from the key number and a unique key; a signature generation device configured to generate a signature associated with the key number; a second input configured to receive encrypted binary data; a decryption device configured to decrypt said encrypted binary data by using the secret key generated by the key generation device; a third input configured to receive an authentication signature; and an authentication device configured to authorize the use of the secret key generated by the key generation device to decrypt said encrypted binary data if the signature generated by the signature generation device is identical to the authentication signature.

Preferably, the secure hardware environment also includes an encryption system comprising: a first input configured to receive a key number; a key generation device configured to generate a secret key from the key number and a unique key, this key generation device being identical to the key generation device of the decryption system; a signature generation device configured to non-reversibly generate a signature associated with the key number, this signature generation device being identical to the signature generation device of the decryption system; a second input configured to receive binary data; a symmetric encryption device configured to encrypt said binary data by using the secret key generated by the key generation device; a first output configured to deliver the binary data encrypted by the encryption device; and a second output configured to deliver the signature generated by the signature generation device, this signature configured for use as an authentication signature by the authentication device.

Thus, the decryption system uses the signature generated by the encryption system as the authentication signature.

Only the signature associated with the key number used for the encrypting can be manipulated outside the secure hardware environment. The secret key cannot be used outside the secure hardware environment.

Furthermore, the signature is non-reversibly generated (i.e., it is not possible to retrieve the unique key by knowing the signature and the key number).

The key number is unique for each secret key generated.

The secret key is unique for a given key number due to the fact that it is generated using a unique key.

In particular, for a given key number and for a given unique key the same secret key is always obtained.

The secret key obtained by the key generation device is different, in particular, if the key number change or if the unique key is different.

Thus, a usage error will be detected if a key number and its associated signature is injected as input of the generating system and of the authenticating system with a unique key that is different from the one used to generate the signature. The authentication device then prevents the use of the secret key for decrypting the encrypted binary data. The signature therefore makes it possible to link a key number with a single unique key.

The authentication signature therefore makes it possible to authenticate the secret key generated by the decryption system.

An integrated circuit in accordance with the embodiments makes it possible to avoid communicating the secret key outside the secure hardware environment by communicating in its place a signature associated with a key number used to generate this secret key.

An integrated circuit in accordance with the embodiments therefore allows for the symmetric encryption/decryption of binary data using a known secret key that can be used only in the secure hardware environment.

The secure hardware environment is a secure "hardware".

The encryption system and the decryption system can be combined or be at least partially separate. When they are combined, the key generation device of the encryption system and the key generation device of the decryption system are formed by the same device. Likewise, the signature generation device of the encryption system and the signature generation device of the decryption system are formed by the same device. Furthermore, the encryption device and the decryption device are formed by the same device.

Furthermore, preferably, the encryption system can also use the third input configured to receive an authentication signature and include the authentication device. The authentication device can then be configured to authorize the use of the secret key generated by the key generation device to encrypt said binary data if the signature generated by the signature generation device is identical to the authentication signature.

Thus, if an incorrect authentication signature is injected as input of the encryption system, the signature generated by the encryption system from the injected key number will be different from the authentication signature. The authentication device then detects that the authentication signature is not the one that is expected and then prevents the use of the secret key for encrypting the binary data.

The authentication signature then makes it possible to authenticate the secret key generated by the encryption system.

In an advantageous embodiment, the secure hardware environment comprises a key registry wherein each secret key generated by the key generation device of the decryption system can be recorded. The key registry is configured to deliver a recorded secret key to the decryption device to decrypt said encrypted binary data, and the authentication device is configured to authorize the recording of a secret key only if the signature generated by the signature generation device of the decryption system is identical to the authentication signature.

Thus, the secret key cannot be read by software but can be used by this software once the secret key is recorded in the key registry.

In an advantageous embodiment, the unique key is a unique hardware key recorded in the secure hardware environment. The unique key can also be rendered unique by taking an execution context into account.

In an advantageous embodiment, the encryption device of the binary data and the decryption device of the encrypted binary data are configured to carry out the same AES encryption/decryption algorithm in order to encrypt or decrypt the binary data.

In an advantageous embodiment, the key generation devices of the encryption system and of the decryption system are configured to carry out an AES algorithm according to the CCM mode (i.e., a counter mode with CBC-MAC), in order to generate the secret key from the key number and the unique key.

Alternatively, the key generation devices of the encryption system and of the decryption system are configured to implement an AES algorithm according to the mode GCM (for "Galois/Counter Mode") in order to generate the secret key from the key number and the unique key.

In an embodiment, a method for decrypting encrypted binary data in a secure hardware environment comprises: receiving a key number; generating a secret key from the key number and a unique key; generating a signature associated with the key number; receiving said encrypted binary data; receiving an authentication signature; decrypting said encrypted binary data by using said secret key if the signature generated is identical to the authentication signature; and delivering the decrypted binary data outside the secure hardware environment.

In an embodiment, a method for encrypting binary data in a secure hardware environment comprises: receiving a key number; generating a secret key from the key number and a unique key; non-reversibly generating a signature associated with the key number; receiving said binary data; encrypting said binary data by using the secret key; delivering encrypted binary data outside the secure hardware environment; and delivering the signature associated with the key number outside the secure hardware environment, this signature being adapted for being used as an authentication signature in a decryption method such as described hereinabove.

Thus, the decryption method uses therefore as authentication signature the signature generated during an encryption method such as described hereinabove.

BRIEF DESCRIPTION OF THE DRAWINGS

Other advantages and characteristics of the embodiments shall appear when examining the detailed description of embodiments and implementations, in no way limiting, and the accompany drawings wherein.

DETAILED DESCRIPTION

Figure 1:
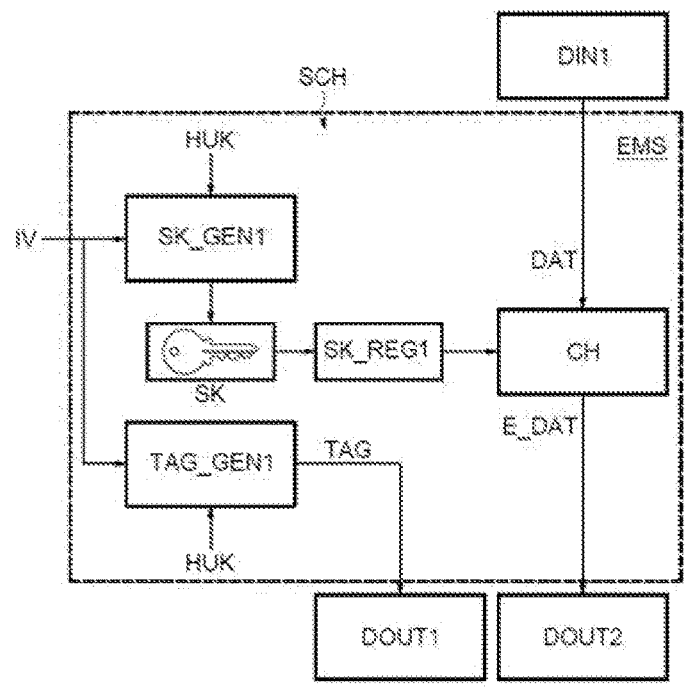
FIGS. 1 and 2 illustrate a secure hardware environment EMS comprising an encryption system.
Figure 4:
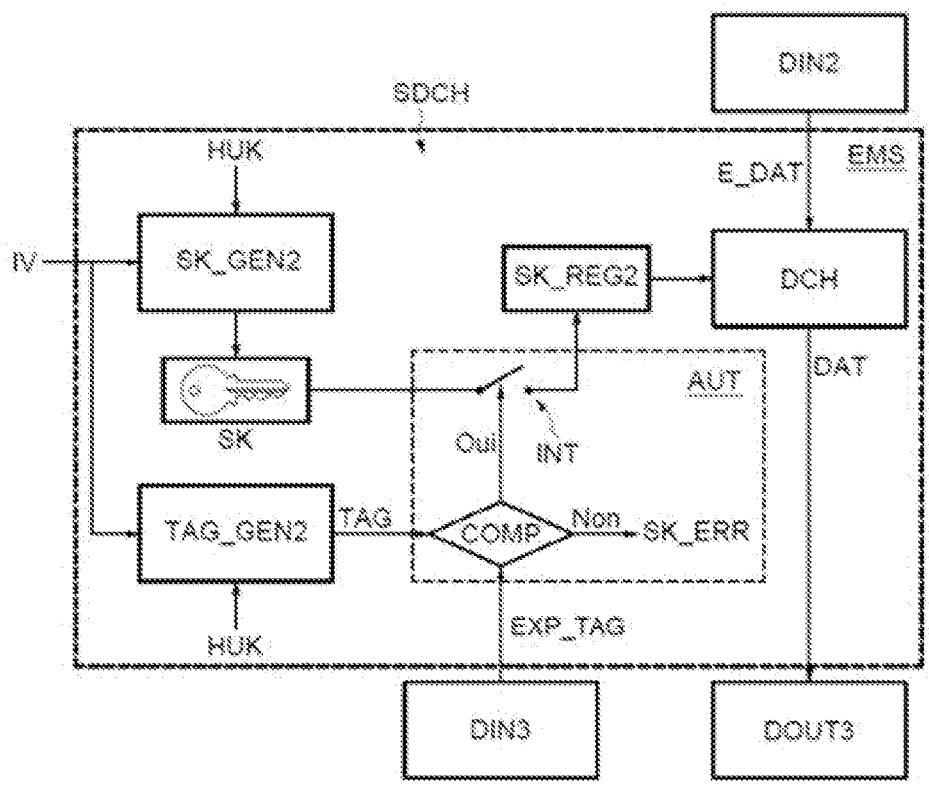
FIGS. 4 and 5 illustrate a secure hardware environment EMS comprising a decryption system.

An integrated circuit according to an embodiment comprises a secure hardware environment EMS comprising an encryption system SCH shown in FIG. 1 and a decryption system SDCH shown in FIG. 4.

The encryption system SCH comprises a first input configured to receive a key number in a portion of an initialization vector IV used by an AES algorithm according to a CCM or GCM mode (acronym for "Galois/Counter Mode") as described hereinbelow. The key number is, by definition, unique for each secret key generated.

The encryption system SCH also comprises a key generation device SK_GEN1. The key generation device SK_GEN1 is configured to generate a secret key SK from the key number and a unique key.

The unique key can be a unique hardware key HUK recorded in the secure hardware environment EMS. The unique hardware key HUK can be obtained by a physical unclonable function (also known by the acronym "PUF").

Alternatively, the unique key can be software secret key locked in a safeguarding register. The unique key can be linked to a given execution context.

Figure 2:
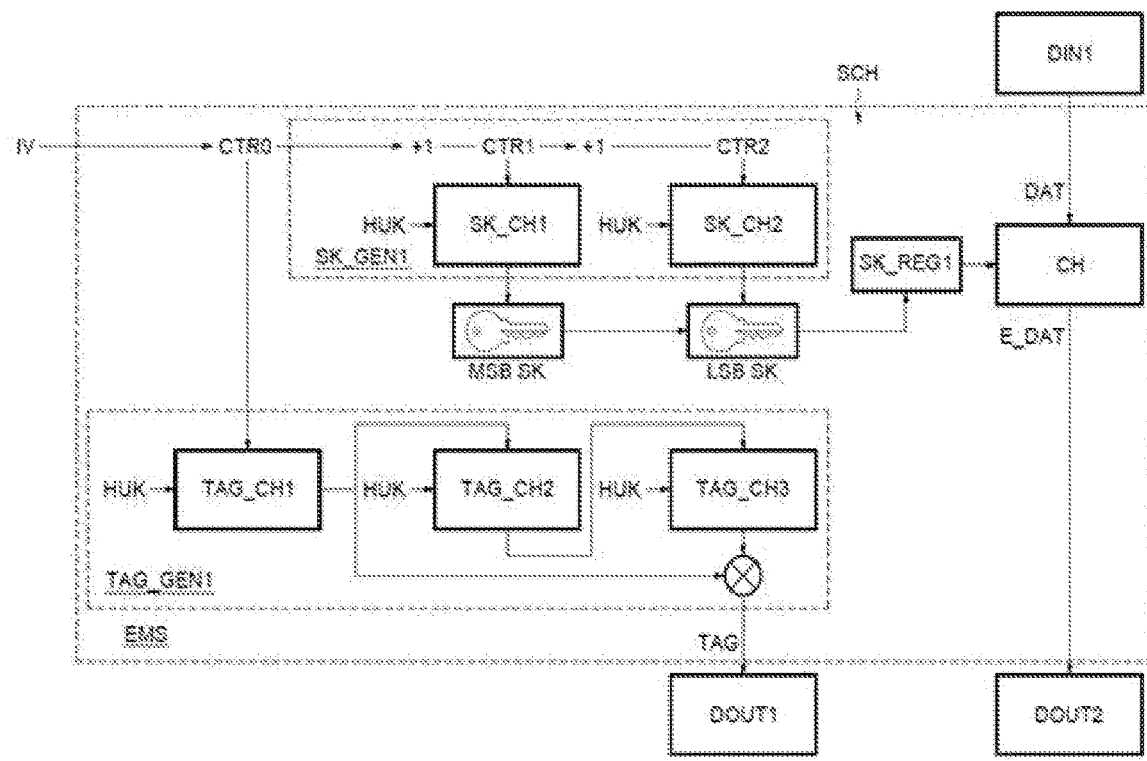

For example, as shown in FIG. 2, the key generation device SK_GEN1 is configured to carry out an AES algorithm according to a CCM mode (i.e., a counter mode with CBC-MAC) in order to generate the secret key SK from the key number and the unique key HUK. The key number can be integrated into an initialization vector IV. This key number can be retrieved using a mask applied on the initialization vector IV.

In particular, the secret key SK is generated from the key number incremented by a counter CTR and by a unique key, for example the unique hardware key HUK. The key generation device SK_GEN1 comprises a first encryption device SK_CH1 and a second encryption device SK_CH2.

The first encryption device SK_CH1 is configured to generate the most significant bits MSB SK of the secret key SK. The second encryption device SK_CH2 is configured to generate the least significant bits LSB SK of the secret key SK.

More particularly, the first encryption device SK_CH1 takes as input the unique key HUK and the key number incremented a first time by the counter CTR1. The first encryption device SK_CH1 can carry out an AES encryption algorithm for example.

The second encryption device SK_CH2 takes as input the unique key HUK and the key number incremented a second time by the counter CTR2. The second encryption device SK_CH1 can carry out an AES encryption algorithm for example.

The most significant bits MSB SK of the secret key SK and the least significant bits LSB SK of the secret key SK are then combined in such a way as to form the secret key SK which can then be recorded in a key registry SK_REG1.

The encryption system SCH also comprises a signature generation device TAG_GEN1. The signature generation device TAG_GEN1 is configured to non-reversibly generate a signature TAG associated with the key number received as input of the secure hardware environment EMS. As the signature TAG is generated in a non-reversible manner, meaning that it is not possible to retrieve the unique key from the key number and the signature TAG.

For example, as shown in FIG. 2, the signature generation device TAG_GEN1 comprises three encryption devices TAG_CH1, TAG_CH2 and TAG_CH3.

A first encryption device TAG_CH1 is configured to encrypt the key number by using the unique key HUK.

A second encryption device TAG_CH2 is configured to encrypt the output of the first encryption device TAG_CH1 by using the unique key HUK.

A third encryption device TAG_CH3 is configured to encrypt the output of the second encryption device TAG_CH2 by using the unique key HUK.

These three encryption devices TAG_CH1, TAG_CH2, TAG_CH3 can carry out an AES encryption algorithm for example.

The signature TAG is obtained by carrying out an exclusive OR function (XOR) by taking as input the output of the encryption devices TAG_CH1 and TAG_CH3.

The encryption system SCH also comprises an output configured to deliver the signature TAG generated by the signature generation device TAG_GEN1 to a first output register DOUT1 outside the secure hardware environment EMS.

The signature TAG can then be manipulated by software from the first output register DOUT1.

The encryption system SCH also comprises a second input configured to receive binary data DAT to be encrypted recorded in an input register DIN1 outside the secure hardware environment EMS.

The encryption system SCH comprises a symmetric encryption device CH for encrypting the binary data DAT from the input register DIN1. In particular, the symmetric encryption device CH is configured to encrypt said binary data DAT by using the secret key SK generated by the key generation device SK_GEN1 and recorded in the key registry SK_REG1.

Preferably, the binary data encryption device CH is configured to carry out an AES encryption algorithm for encrypting binary data DAT by using a secret key SK generated by the key generation device SK_GEN1.

The encryption system SCH also comprises an output configured to deliver the binary data E_DAT encrypted by the encryption device to a second output register DOUT2 outside the secure hardware environment.

Figure 3:
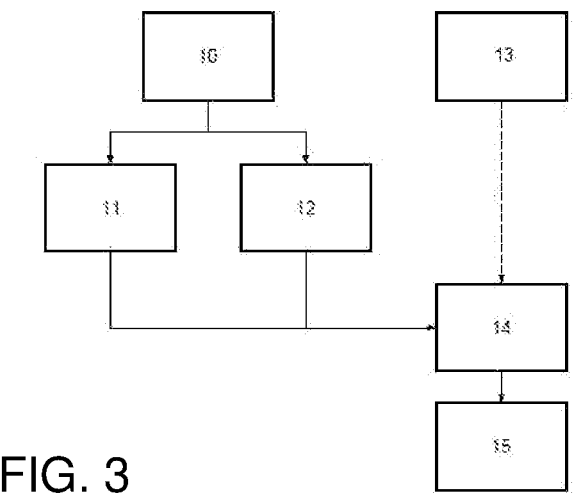
FIG. 3 illustrates a method of operation.

A method for encrypting binary data DAT in the secure hardware environment is shown in FIG. 3 according to an embodiment. The encryption method comprises a step 10 of receiving a key number in the secure hardware environment EMS.

Then, the encryption method comprises a step 11 of generating a secret key SK wherein the secret key SK is generated by the key generation device SK_GEN1 of the encryption system SCH by using the key number received and a unique key, in particular a unique hardware key HUK. In particular, for a given key number and for a given unique key the same secret key SK is always obtained.

The secret key SK is then recorded in the key registry SK_REG1.

The encryption method also comprises a step 12 of generating a signature TAG associated with the key number. In this step 12, a signature TAG is non-reversibly generated by the signature generation device TAG_GEN1 of the encryption system SCH.

The encryption method also comprises a step 13 of receiving binary data DAT to be encrypted. This binary data DAT originates in particular from the input register DIN1 outside the secure hardware environment EMS.

The encryption method then comprises a step 14 of encrypting the binary data DAT received. In this step 14 of encrypting, the binary data DAT is encrypted by the encryption device CH by using the secret key SK recorded in the key registry SK_REG1.

The encryption method further comprises a step 15 of delivering outside the secure hardware environment EMS encrypted binary data E_DAT and the signature TAG generated associated with the key number used to encrypt the binary data DAT.

In particular, the signature delivered is recorded in the output register DOUT1 and the encrypted binary data E_DAT is recorded in the output register DOUT2.

Software can then retrieve the signature TAG and the encrypted binary data E_DAT recorded in output register DOUT1 and DOUT2.

In particular, this software can use the signature TAG retrieved in order to be able to use it to subsequently decrypt the encrypted binary data E_DAT retrieved.

Figure 5:
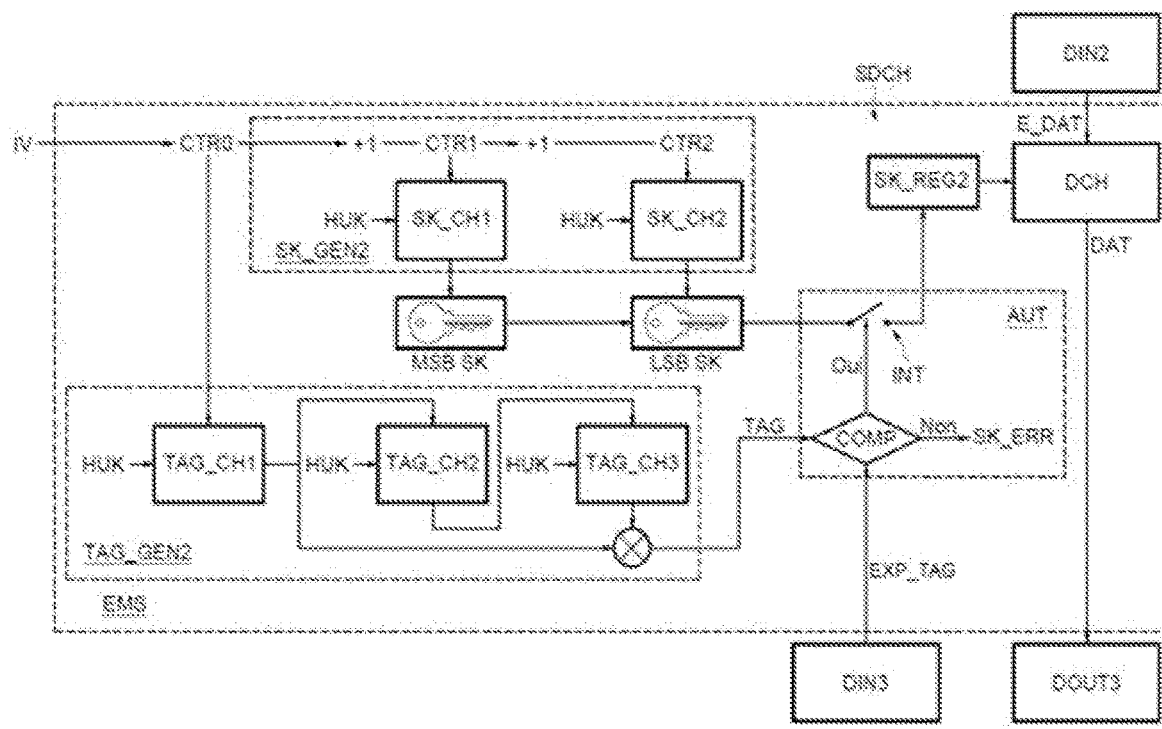

FIGS. 4 and 5 show a decryption system SDCH according to an embodiment.

The decryption system SDCH comprises a first input configured to receive a key number.

The decryption system SDCH further comprises a key generation device SK_GEN2. The key generation device SK_GEN2 is configured to generate a secret key SK using a unique key, in particular a unique hardware key HUK, and the key number received from the first input of the decryption system. This unique key is identical to the one used by the encryption system SCH.

The key generation device SK_GEN2 of the decryption system SDCH is identical to the key generation device SK_GEN1 of the encryption system SCH. Preferably, a single device is used to form these two key generation devices SK_GEN1, SK_GEN2. Alternatively, it is possible to provide two separate key generation devices SK_GEN1, SK_GEN2.

For example, the key generation device SK_GEN2 of the decryption system SDCH is configured to carry out an AES algorithm according to a CCM mode.

The decryption system SDCH also comprises a key registry SK_REG2 configured to record secret keys SK generated by the key generation device SK_GEN2 of the decryption system SDCH. The key registry SK_REG2 of the decryption system SDCH can be the same as the key registry SK_REG1 of the encryption system SCH.

The decryption system SDCH also comprises a signature generation device TAG_GEN2. The signature generation device TAG_GEN2 is configured to generate a signature TAG associated with the key number received as input from the secure hardware environment EMS.

The signature generation device TAG_GEN2 of the decryption system SDCH is identical to the signature generation device TAG_GEN1 of the encryption system SCH. Preferably, a single device is used to form these two signature generation devices TAG_GEN1, TAG_GEN2. Alternatively, it is possible to provide two separate signature generation devices TAG_GEN1, TAG_GEN2.

The decryption system SDCH further comprises a second input configured to receive encrypted binary data E_DAT from an input register DIN2 outside the secure hardware environment EMS.

The decryption system SDCH also comprises a decryption device DCH of the encrypted binary data E_DAT. The decryption device DCH is configured to decrypt the encrypted binary data E_DAT received by the second input by using the secret key SK generated by the key generation device SK_GEN2 and recorded in the key registry SK_REG2.

The decryption device DCH implements the same encryption/decryption algorithm as the encryption device CH of the encryption system SCH, for example an AES algorithm. Preferably, the same device forms the encryption device CH of the encryption system SCH and the decryption device DCH of the decryption system SDCH.

The decryption system SDCH also comprises a third input configured to receive an authentication signature EXP_TAG from an input register DIN3 outside the secure hardware environment EMS.

The decryption system SDCH further comprises an authentication device AUT. The authentication device AUT comprises a switch INT that has a first terminal connected to an output of the key generation device SK_GEN2 and a second terminal connected to the key registry SK_REG2. This switch INT can be controlled in an open state or in a closed state. When the switch INT is controlled in a closed state, the switch INT allows for the recording of the secret keys SK generated by the key generation device SK_GEN2 in the key registry SK_REG2. When the switch INT is controlled in an open state, the switch INT prevents the recording of the secret keys SK generated by the key generation device SK_GEN2 in the key registry SK_REG2.

The switch INT can be formed by a transistor for example.

The authentication device AUT further comprises a comparator COMP used to control the switch INT.

The comparator COMP is configured to compare a signature TAG generated by the signature generation device TAG_GEN2 with the authentication signature EXP_TAG.

If the signature TAG generated is identical to the authentication signature EXP_TAG, the comparator is configured to control the switch INT in the closed state in such a way that the secret key SK generated by the key generation device of the decryption system can be recorded in the key registry SK_REG2.

If the signature TAG generated is different from the authentication signature EXP_TAG, the comparator COMP is configured to control the switch INT in the open state in such a way as to prevent a recording in the key registry SK_REG2 of the secret key SK generated by the key generation device SK_GEN2 of the decryption system SDCH. In this case, the authentication device AUT is configured to emit an error signal SK_ERR.

The authentication device AUT is thus configured to authorize the use of the secret key SK generated by the key generation device SK_GEN2 to decrypt said encrypted binary data E_DAT if the signature TAG generated by the signature generation device TAG_GEN2 is identical to the authentication signature EXP_TAG.

Figure 6:
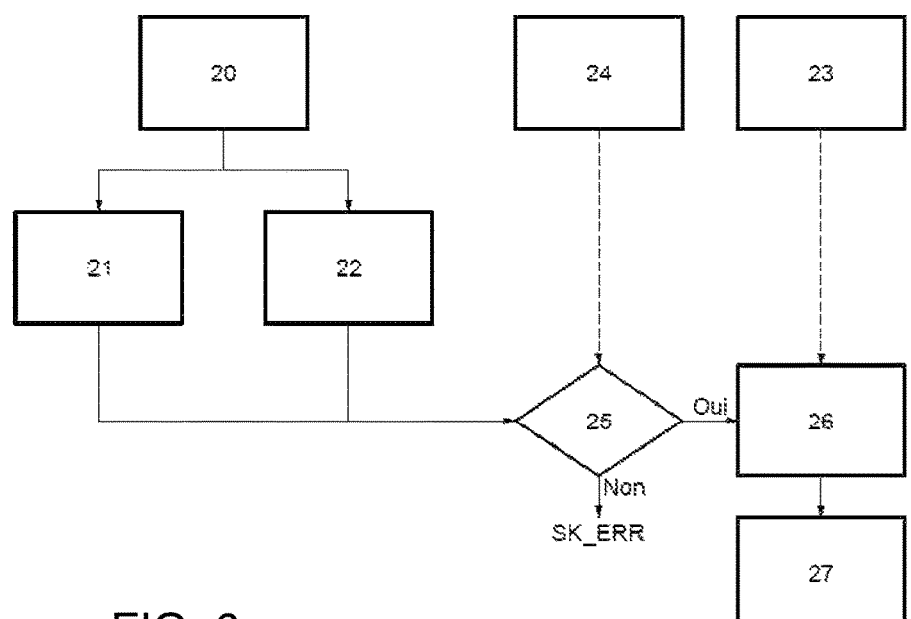
FIG. 6 illustrates a method of operation.

A decryption method in the secure hardware environment EMS encrypted binary data E_DAT is shown in FIG. 6. The method comprises a step 20 of receiving a key number as input of the secure hardware environment EMS.

The decryption method also comprises a step 23 of receiving encrypted binary data E_DAT. This encrypted binary data E_DAT originates in particular from the input register DIN2 outside of the secure hardware environment EMS.

The decryption method also comprises a step 24 of receiving in the secure hardware environment EMS an authentication signature EXP_TAG from the input register DIN3.

In particular, the authentication signature EXP_TAG is associated with a key number used beforehand to generate a secret key SK for encrypting binary data DAT according to an encryption method such as described hereinabove in order to obtain encrypted binary data E_DAT. It is this encrypted binary data E_DAT that is received as input during the decryption method.

Then, the decryption method comprises a step 21 of generating a secret key SK wherein the secret key SK is generated by the key generation device SK_GEN2 of the decryption system SDCH by using the key number received and a unique key, for example a unique hardware key HUK.

The decryption method also comprises a step 22 of generating a signature TAG associated with the key number received. In this step 22, a signature TAG is generated by the signature generation device TAG_GEN2 of the decryption system SDCH.

The decryption method also comprises a step 25 of authenticating wherein the signature TAG generated by the signature generation device TAG_GEN2 of the decryption system SDCH is compared with the authentication signature EXP_TAG. In particular, the step 25 of authenticating is implemented by the authentication device AUT. The comparator COMP determines if the signature TAG generated is identical to the authentication signature EXP_TAG.

If the signature TAG generated is identical to the authentication signature EXP_TAG, the comparator COMP controls the switch INT in the closed state in such a way that the secret key SK generated by the key generation device SK_GEN2 of the decryption system SDCH is recorded in the key registry SK_REG2.

If the signature TAG generated is different from the authentication signature EXP_TAG, the comparator COMP controls the switch INT in the open state in such a way as to prevent a recording in the key registry SK_REG2 of the secret key SK generated by the key generation device SK_GEN2 of the decryption system SDCH. The authentication device AUT then emits an error signal SK_ERR.

If during the authentication step 25 the comparator COMP determines that the signature TAG generated is identical to the authentication signature EXP_TAG, the decryption method then comprises a step 26 of decrypting the encrypted binary data E_DAT received.

In this decryption step 26, the encrypted binary data E_DAT is decrypted by the decryption device DCH by using the secret key SK recorded beforehand in the key registry SK_REG2.

The decryption method then comprises a step 27 of delivering outside the secure hardware environment EMS the decrypted binary data DAT. In particular, the decrypted binary data DAT are recorded in the output register DOUT3.

The encryption method and the decryption method make it possible to communicate outside the secure hardware environment EMS only an authentication signature EXP_TAG associated with the key number used to generate a secret key SK for encrypting binary data DAT. The secret key SK is therefore known and can be used only in the secure hardware environment EMS. The encryption method and the decryption method therefore make it possible to ensure secure management of secret keys SK, which cannot be read outside the secure hardware environment EMS.

Thus, a usage error will be detected if a key number and its associated signature EXP_TAG is injected as input of the generating system and of the authenticating system with a unique key HUK that is different from the one used to generate the signature. The authentication device AUT then prevents the use of the secret key SK for decrypting the encrypted binary data. The signature therefore makes it possible to link a key number with a single unique key HUK.

Furthermore, if an incorrect key number is injected as input of the decryption system SDCH for decrypting encrypted binary data E_DAT, the signature TAG associated with this incorrect key number will be different from the authentication signature EXP_TAG associated with the key number used to encrypt this binary data DAT. The authentication device AUT then detects that the injected key number is not the expected one and then prevents the decryption of the encrypted binary data E_DAT.

Preferably, the encryption system SCH can also use an input configured to receive an authentication signature EXP_TAG and an authentication device. This input and this authentication device can be the same as those of the decryption system. The authentication device AUT can then be configured to authorize the use of the secret key generated by the key generation device SK_GEN1 of the encryption system SCH to encrypt said binary data if the signature generated by the signature generation device TAG_GEN1 is identical to the authentication signature EXP_TAG.

Thus, if an incorrect authentication signature EXP_TAG is injected as input of the encryption system SCH, the signature generated by the encryption system from the injected key number will be different from the authentication signature EXP_TAG. The authentication device then detects that the authentication signature EXP_TAG is not the expected one and then prevents the use of the secret key for decrypting binary data.

The authentication signature then makes it possible to authenticate the secret key generated by the encryption system.

The invention claimed is:

1. An integrated circuit, comprising:
a secure hardware environment including a decryption system;
wherein the decryption system comprises:
a first input configured to receive a key number;
a key generation device configured to generate a secret key from the key number and a unique key;
a signature generation device configured to non-reversibly generate a signature from the key number and the unique key;
a second input configured to receive encrypted binary data;
a decryption device configured to decrypt said encrypted binary data by using the secret key generated by the key generation device;
a third input configured to receive an authentication signature; and
an authentication device configured to authorize the use of the secret key generated by the key generation device to decrypt said encrypted binary data if the signature generated by the signature generation device is identical to the authentication signature.

2. The integrated circuit according to claim 1, wherein the secure hardware environment further comprises:
a key registry configured to record the secret key generated by the key generation device, and
a switch controlled to pass the secret key to the key registry;
wherein the authentication device is configured to control the switch to pass the secret key to the key registry for recording only if the signature generated by the signature generation device of the decryption system is identical to the authentication signature.

3. The integrated circuit according to claim 2, wherein an output of the key registry delivers the recorded secret key to the decryption device to decrypt said encrypted binary data.

4. The integrated circuit according to claim 1, wherein the unique key is a unique hardware key recorded in the secure hardware environment.

5. The integrated circuit according to claim 1, wherein the decryption device is configured to carry out an AES decryption algorithm.

6. The integrated circuit according to claim 1, wherein the key generation device is configured to carry out an AES algorithm according to a counter mode with CBC-MAC in order to generate the secret key from the key number and the unique key.

7. The integrated circuit according to claim 1, wherein the key generation device is configured to implement an AES algorithm according to a mode GCM in order to generate the secret key from the key number and the unique key.

8. The integrated circuit according to claim 1, wherein the secure hardware environment further includes an encryption system, said encryption system comprising:
a fourth input configured to receive binary data;
a symmetric encryption device configured to encrypt said binary data by using the secret key generated by the key generation device;
a first output configured to deliver the binary data encrypted by the symmetric encryption device; and
a second output configured to deliver the signature generated by the signature generation device.

9. The integrated circuit according to claim 8, wherein said encryption system further comprises:
a first input configured to receive a key number,
a further key generation device configured to generate the secret key from the key number and the unique key; and
a further signature generation device configured to non-reversibly generate the signature from the key number and the unique key.

10. The integrated circuit according to claim 9, wherein the further signature generation device of the encryption system is identical to the signature generation device of the decryption system.

11. The integrated circuit according to claim 9, wherein the further signature generation device of the encryption system is same as the signature generation device of the decryption system.

12. The integrated circuit according to claim 9, wherein the further key generation device of the encryption system is identical to the key generation device of the decryption system.

13. The integrated circuit according to claim 9, wherein the further key generation device of the encryption system is same as the key generation device of the decryption system.

14. The integrated circuit according to claim 9, wherein the secure hardware environment further comprises:
a first key registry configured to record the secret key generated by the key generation device; and
a second key registry configured to record the secret key generated by the further key generation device.

15. The integrated circuit according to claim 9, wherein the decryption device is configured to carry out an AES decryption algorithm and the symmetric encryption device is configured to carry out an AES encryption algorithm.

16. The integrated circuit according to claim 9, wherein the key generation device and further key generation device are each configured to carry out an AES algorithm according to a counter mode with CBC-MAC in order to generate the secret key from the key number and the unique key.

17. The integrated circuit according to claim 9, wherein the key generation device and further key generation device are each configured to implement an AES algorithm according to a mode GCM in order to generate the secret key from the key number and the unique key.

18. A method for decrypting encrypted binary data in a secure hardware environment, comprising:
 receiving a key number;
 generating a secret key from the key number and a unique key;
 non-reversibly generating a signature from the key number and the unique key;
 receiving said encrypted binary data;
 receiving an authentication signature;
 decrypting said encrypted binary data by using said secret key if the signature generated is identical to the authentication signature;
 delivering decrypted binary data outside the secure hardware environment.

19. A method for encrypting binary data in a secure hardware environment, comprising:
 receiving a key number;
 generating a secret key from the key number and a unique key;
 non-reversibly generating a signature from the key number and the unique key;
 receiving said binary data;
 encrypting said binary data by using the secret key;
 delivering outside the secure hardware environment encrypted binary data; and
 delivering the signature associated with the key number outside the secure hardware environment, said signature being adapted for being used as an authentication signature in a decryption method.

* * * * *